(12) United States Patent
Del Pozo Gonzalez et al.

(10) Patent No.: US 10,434,959 B2
(45) Date of Patent: Oct. 8, 2019

(54) VEHICLE INTERIOR TRIM ASSEMBLY INCLUDING RIGID INTERIOR TRIM COMPONENTS CONNECTED TO ONE ANOTHER AND A FLEXIBLE SUSPENSION THAT BIASES THE RIGID INTERIOR TRIM COMPONENTS TOWARD ONE ANOTHER TO LIMIT MOVEMENT THEREBETWEEN

(71) Applicant: GM Global Technology Operations LLC, Detroit, MI (US)

(72) Inventors: Luis Miguel Del Pozo Gonzalez, Estado de Mexico Z.C. (MX); Alan Denys Aldrete Meza, Estado de Mexico C.P. (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 15/918,492

(22) Filed: Mar. 12, 2018

(65) Prior Publication Data
US 2019/0275961 A1    Sep. 12, 2019

(51) Int. Cl.
*B60R 13/02* (2006.01)
*B60R 7/08* (2006.01)

(52) U.S. Cl.
CPC .......... *B60R 13/0243* (2013.01); *B60R 7/081* (2013.01); *B60R 13/0206* (2013.01); *B60R 2013/0287* (2013.01); *B60R 2013/0293* (2013.01)

(58) Field of Classification Search
CPC ........ B60R 13/0243; B60R 2013/0293; B60R 7/081; E05B 79/20
USPC ......................................................... 296/37.1
See application file for complete search history.

(56) References Cited

U.S. PATENT DOCUMENTS

| | | | |
|---|---|---|---|
| 8,998,282 B2 * | 4/2015 | Gerndorf | B60R 11/0235 296/1.08 |
| 9,108,530 B2 * | 8/2015 | Yamaguchi | B60R 13/0206 |
| 9,695,850 B2 * | 7/2017 | Hirakawa | F16B 2/20 |
| 9,995,331 B2 * | 6/2018 | Heimann | F16B 21/075 |
| 10,005,406 B2 * | 6/2018 | Shen | B60Q 3/51 |
| 10,220,748 B2 * | 3/2019 | Inami | B60N 2/78 |
| 10,246,021 B2 * | 4/2019 | Lemarchand | B60N 2/58 |

(Continued)

FOREIGN PATENT DOCUMENTS

WO    WO-2011095746 A2 *    8/2011    ......... B60R 13/0206

*Primary Examiner* — Pinel E Romain (57) ABSTRACT

A vehicle interior trim assembly includes a first trim component and a second trim component. The first trim component includes a first base plate and a protrusion. The second trim component includes a connection clip and a connection suspension. An opening in the connection clip receives the protrusion, and the connection clip engages an underside surface of the protrusion to yield a snap fit between the connection clip and the protrusion. The snap fit secures the second trim component to the first trim component. The connection suspension is configured to yield an interference fit between the connection suspension and one of the first base plate and the protrusion when the second trim component is assembled to the first trim component. The interference fit yields a biasing force that biases the connection clip toward the underside surface of the protrusion to limit movement between the first and second trim components.

20 Claims, 9 Drawing Sheets

(56) References Cited

U.S. PATENT DOCUMENTS

2007/0214845 A1\* 9/2007 Gilleo ................ B60R 21/0428
70/208

\* cited by examiner

VEHICLE INTERIOR TRIM ASSEMBLY INCLUDING RIGID INTERIOR TRIM COMPONENTS CONNECTED TO ONE ANOTHER AND A FLEXIBLE SUSPENSION THAT BIASES THE RIGID INTERIOR TRIM COMPONENTS TOWARD ONE ANOTHER TO LIMIT MOVEMENT THEREBETWEEN

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle interior trim assemblies that include rigid interior trim components connected to one another and a flexible suspension that biases the rigid interior trim components toward one another to limit movement therebetween.

A vehicle typically includes several interior trim components that are made from relatively rigid materials such as plastic. Examples of such rigid interior trim components include an interior door panel, a map pocket panel, the housing of a switch module, and a switch plate. The map pocket panel holds items such as maps and is typically attached to the interior side of the interior door panel. The switch module typically includes window switches, door switches, and rear view mirror switches. The switch plate fits over the switch module and covers components of the switch module that are not aesthetically pleasing, such as electrical wiring.

The rigid interior trim components of a vehicle are joined together using a rigid connection method such as heat staking. The fastening features of the rigid connection are typically part of the rigid interior trim components. In one example, a map pocket panel includes a boss, and an interior door panel includes an aperture. To assemble the map pocket panel to the interior door panel, the boss on the map pocket panel is inserted into the aperture in the interior door panel. The boss is slightly undersized relative to the aperture to yield a slip fit between the boss and the aperture. Once the boss is inserted into the aperture, the boss is heated to increase the size of the boss and prevent the boss from being withdrawn from the aperture.

In some cases, the map pocket panel includes multiple bosses, and the interior door panel includes multiple apertures. To assemble the map pocket panel to the interior door panel, some of the bosses are inserted into some of the apertures, heated, and reshaped (heat staked) to take the form of a plastic rivet. The rest of the bosses are in the form of conical snap features that do not need thermal energy, but rather require mechanical or kinetic energy to push the conical snap features through the rest of the apertures to form a mechanical snap fit joint.

SUMMARY

A vehicle interior trim assembly according to the present disclosure includes a first trim component and a second trim component. The first trim component includes a first base plate and at least one protrusion projecting from the first base plate. The at least one protrusion has a ramped upper surface and an underside surface. The second trim component includes a second base plate, a connection clip extending from the second base plate, and a connection suspension extending from the second base plate. The connection clip defines an opening configured to receive the protrusion of the first trim component when the second trim component is assembled to the first trim component. The connection clip is configured to flex as the connection clip engages the ramped upper surface of the at least one protrusion to allow the opening to be positioned over the at least one protrusion. The connection clip is configured to relax and engage the underside surface of the at least one protrusion when the at least one protrusion is positioned within the opening to yield a snap fit between the connection clip and the at least one protrusion. The snap fit securing the second trim component to the first trim component. The connection suspension is configured to yield an interference fit between the connection suspension and one of the first base plate and the at least one protrusion when the second trim component is assembled to the first trim component. The interference fit yields a biasing force that biases the connection clip toward the underside surface of the at least one protrusion to limit movement between the first and second trim components.

In one example, when the second trim component is assembled to the first trim component, the connection clip applies a first force in a first direction to the underside surface of the protrusion, and the connection suspension applies a second force in a second direction to the first base plate. The second direction is opposite of the first direction.

In one example, the connection clip has a first stiffness in the first direction, and the connection suspension has a second stiffness in the second direction. The second stiffness is less than the first stiffness.

In one example, the connection clip and the connection suspension are made from the same material, and the second stiffness of the connection suspension is less than the first stiffness of the connection clip due to a geometric difference between the connection clip and the connection suspension.

In one example, the connection clip is configured to flex in a first direction away from the ramped upper surface of the at least one protrusion as the connection clip engages the ramped upper surface of the at least one protrusion, and the connection suspension is configured to flex in a second direction when the connection suspension engages one of the first base plate and the at least one protrusion. The second direction is perpendicular to the first direction.

In one example, the connection suspension is configured to yield the interference fit between the connection suspension and the first base plate when the second trim component is assembled to the first trim component.

In one example, the at least one protrusion includes a first protrusion and a second protrusion, the opening is configured to receive the first protrusion when the second trim component is assembled to the first trim component, and the connection suspension is configured to yield the interference fit between the connection suspension and the second protrusion when the second trim component is assembled to the first trim component.

In one example, the connection suspension includes a flexible connection arm having a sinusoidal shape.

In one example, the connection suspension includes a flexible connection arm that is L-shaped.

In one example, the connection suspension includes a pair of flexible connection arms that define a pair of openings and that are symmetric with respect to a plane disposed between the openings.

Another vehicle interior trim assembly according to the present disclosure includes a switch module and a switch plate. The switch module includes at least one of a window switch and a door lock switch, sidewalls, a first protrusion, and a second protrusion. The first and second protrusions project from the sidewalls. Each of the first and second protrusions having a ramped upper surface and an underside surface. The switch plate is configured to cover at least a portion of the switch module. The switch plate includes sidewalls, a connection clip, and a connection suspension. The switch plate sidewalls are configured to fit around the switch module sidewalls when the switch plate is assembled to the switch module. The connection clips extend from a lower edge of one of the switch plate sidewalls. The connection suspension extends from the same lower edge or a lower edge of another one of the switch plate sidewalls. The connection clip defines an opening configured to receive the first protrusion of the switch module when the switch plate is assembled to the switch module. The connection clip is configured to flex as the connection clip engages the ramped upper surface of the first protrusion to allow the opening to be positioned over the first protrusion. The connection clip is configured to relax and engage the underside surface of the first protrusion when the first protrusion is positioned within the opening to yield a snap fit between the connection clip and the first protrusion. The snap fit secures the switch plate to the switch module. The connection suspension is configured to yield an interference fit between the connection suspension and one of the switch module sidewalls and the second protrusion when the switch plate is assembled to the switch module. The interference fit yields a biasing force that biases the connection clip toward the underside surface of the first protrusion to limit movement between the switch module and the switch plate.

In one example, the connection suspension is configured to yield the interference fit between the connection suspension and the switch module sidewalls when the switch plate is assembled to the switch module.

In one example, the connection suspension includes a flexible connection arm having a sinusoidal shape.

In one example, the connection suspension is configured to yield the interference fit between the connection suspension and the second protrusion when the switch plate is assembled to the switch module.

In one example, the connection suspension includes a pair of flexible connection arms that define a pair of openings and that are symmetric with respect to a plane disposed between the openings.

Another vehicle interior trim assembly includes a map pocket panel and an interior door panel. The map pocket panel is configured to hold items and including a first base plate and a protrusion projecting from the first base plate. The protrusion has a ramped upper surface and an underside surface. The interior door panel includes a second base plate, a connection clip, and a connection suspension. The connection clip includes a plurality of rigid connection arms extending from the second base plate toward one another to define a first opening in the interior door panel. The first opening in the interior door panel is configured to receive the protrusion of the map pocket panel when the map pocket panel is assembled to the interior door panel. The plurality of rigid connection arms are configured to flex as the plurality of rigid connection arms engage the ramped upper surface of the protrusion to allow the first opening to be positioned over the protrusion. The plurality of rigid connection arms are configured to relax and engage the underside surface of the protrusion when the protrusion is positioned within the first opening to yield a snap fit between the plurality of rigid connection arms and the protrusion. The snap fit secures the map pocket panel to the interior door panel. The connection suspension is configured to yield an interference fit between the connection suspension and the first base plate when the map pocket panel is assembled to the interior door panel. The interference fit yields a biasing force that acts on the plurality of rigid connection arms through the second base plate and biases the plurality of rigid connection arms toward the underside surface of the protrusion to limit movement between the map pocket panel and the interior door panel.

In one example, the connection suspension includes a pair of flexible connection arms extending from the second base plate in opposite directions.

In one example, each of the flexible connection arms is L-shaped.

In one example, each of the flexible connection arms includes first and second linear portions. The first linear portion extends from the second base plate in a first direction parallel to a surface of the second base plate. The second linear portion projects from the first linear portion in a second direction toward the first base plate of the map pocket panel.

In one example, the pair of flexible connection arms extend from the second base plate into a corresponding pair of openings in the second base plate that are disposed on opposite sides of the first opening defined by the plurality of rigid connection arms.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As discussed above, rigid interior trim components are typically joined together using a rigid connection or joint, and the fastening features of the rigid connection are typically part of the interior trim components. The size and/or location of these fastening features on the rigid interior trim components affects the geometric clearance of the fastening features, which in turn affects the stiffness and/or dampening properties and/or performance of the connection between the components and the effort required to join the components together. Geometric clearance between fastening features on mating interior trim components is required to allow manufacturing geometric variation stack-up of assembled rigid interior trim components. If the geometric clearance of the connection between the interior trim components is too large (i.e., there is too much slack in the connection), the components move relative to one another and generate an undesired noise such as a squeak or rattle. If the geometric clearance of the connection between the interior trim components is too small, the effort required to join the components together is high. Thus, attempts are typically made to position and/or size the fastening features at locations on the rigid interior trim components that strike a balance between minimizing undesired noise caused by slack in the connection between the components and minimizing the effort required to join the components together.

Attempts to strike a balance between providing a rigid connection and minimizing installation effort typically involve designing and redesigning a tool (e.g., an injection molded die) used to fabricate one of the rigid interior trim components. For example, the tool may be designed to cause the fastening features to have a first geometric property (e.g., a first size, a first shape), and then assembly trials may be performed to determine whether causing the fastening features to have the first geometric property strikes the desired balance. If not, the tool may be redesigned to cause the fastening features to have a second geometric property (e.g., a second size, a second shape) by, for example, increasing or decreasing the size of the fastening features, and then assembly trials may be performed once again. While this trial-and-error method may be repeated until the tool design strikes the desired balance, this trial-and-error method is costly and time consuming.

In some cases, the geometric properties of the fastening features are set to intentionally leave some slack in the connection between the rigid interior trim components to ensure that the effort required to assemble the components is acceptable. Then, a dampening feature such as felt tape is inserted between the rigid interior trim components, typically at locations of rigid connections or rigid-dampened connections, to limit the movement between the components and reduce the amount of undesired noise caused by movement between the components. However, inserting felt tape between the components increases the number of operations that are performed to assemble the components together, which increases assembly costs.

The present disclosure addresses these issues by setting the geometric properties of the fastening features to leave some slack in the connection between the rigid interior trim components, and adding additional features to the components to form a suspension. The suspension biases the components away from one another to absorb mechanical/vibration energy and limit or inhibit the movement between the components and reduce the amount of undesired noise caused by movement between the components. This noise reduction may be made possible by the viscoelastic behavior of polymer(s) in the suspension. In addition, since the features that form the suspension are part of the rigid interior trim components, forming the suspension does not increase the cost of assembling the components together.

In one example, the rigid interior trim components include a switch module and a switch plate, the fastening features include protrusions on the switch module and clips on the switch plate, and the suspension features include nonlinear elements on the switch plate. As the switch plate is assembled to the switch module, the clips engage the protrusions, which causes the clips to flex away from the protrusions until holes in the clips are aligned with the protrusions. At that point, the clips relax somewhat and the protrusions are received in the holes in the clips, which yields a snap fit between the clips and the protrusions. The clips do not relax to their original state, but rather remain flexed to some degree and therefore store the potential energy of deformation that results in quasi-permanent force exerted by the clips on the switch module. The exerted force is in the same direction as external mechanical vibration inputs, which counteracts the negative squeak and rattle effects of the exerted force. In addition, the nonlinear elements on the switch plate are sized to yield an interference fit between the nonlinear elements and a housing of the switch module. This interference fit generates a biasing force that biases the switch plate away from the switch module, and thereby limits movement between the switch plate and the switch module.

In another example, the rigid interior trim components include an interior door panel and a map pocket panel, the fastening features include a protrusion on the map pocket panel and flexible arms on the interior door panel, and the suspension features include linear elements on the interior door panel. The flexible arms have free ends that form an aperture in the interior door panel. The protrusion includes a shank and a head that has a larger diameter than the shank.

As the map pocket panel is assembled to the interior door panel, the free ends of the flexible arms engage the head of the protrusion. Due to this engagement, the flexible arms flex away from the protrusion until the head of the protrusion is slid through the aperture formed by the free ends of the flexible arms. At that point, the flexible arms relax and engage an underside surface of the head, which yields a snap fit between the flexible arms and the protrusions. In addition, the linear elements on the interior door panel are sized to yield an interference fit between the linear elements and a base plate of the map pocket panel. This interference fit generates a biasing force that biases the map pocket panel away from the interior door panel, and thereby limits movement between the map pocket panel and the interior door panel.

Figure 1:
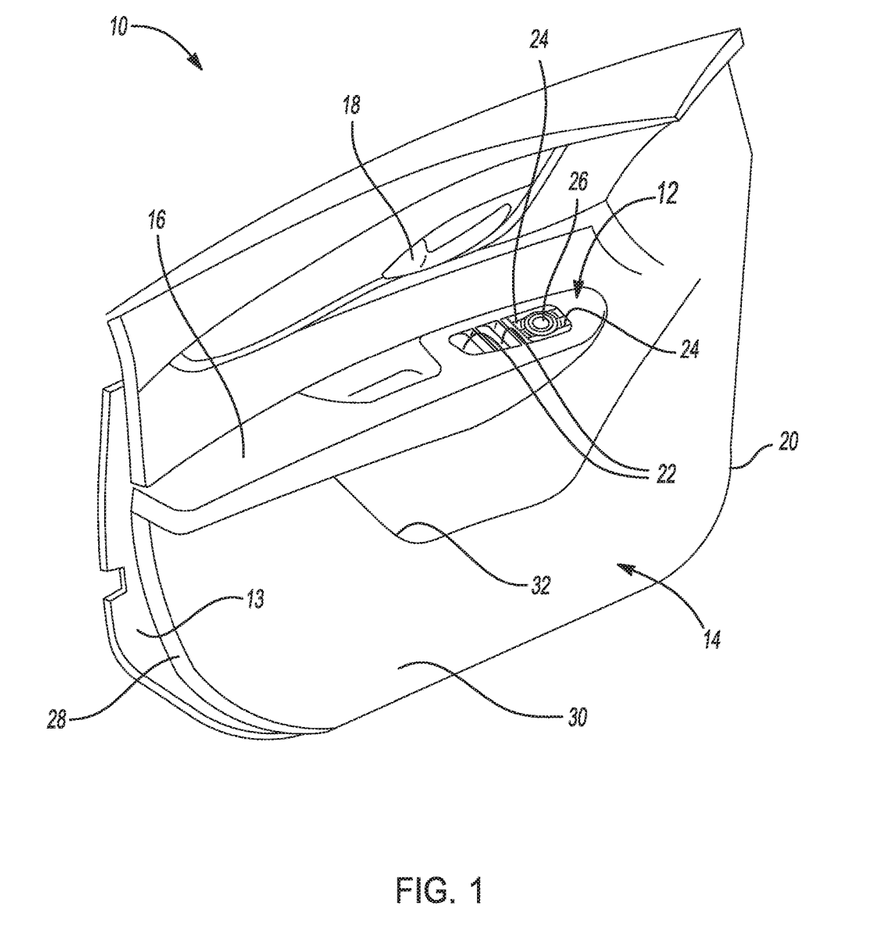
FIG. 1 is a perspective view of a door assembly including a switch assembly and a door panel assembly according to the principles of the present disclosure.

Referring now to FIG. 1, a door assembly 10 includes a switch assembly 12, an exterior door panel 13, an interior door panel assembly 14, an armrest 16, a door handle 18, and speaker 20. The switch assembly 12 includes a plurality of window switches 22, a plurality of door lock switches 24, and a rear view mirror switch 26. The interior door panel assembly 14 includes an interior door panel 28 and a map pocket panel 30. The map pocket panel 30 defines a map pocket 32 configured to hold items such as a map. The interior door panel 28 and/or the map pocket panel 30 may be made from a soft plastic or polymer resin such as thermoplastic olefin (TPO) or polypropylene (PP).

Figure 2:
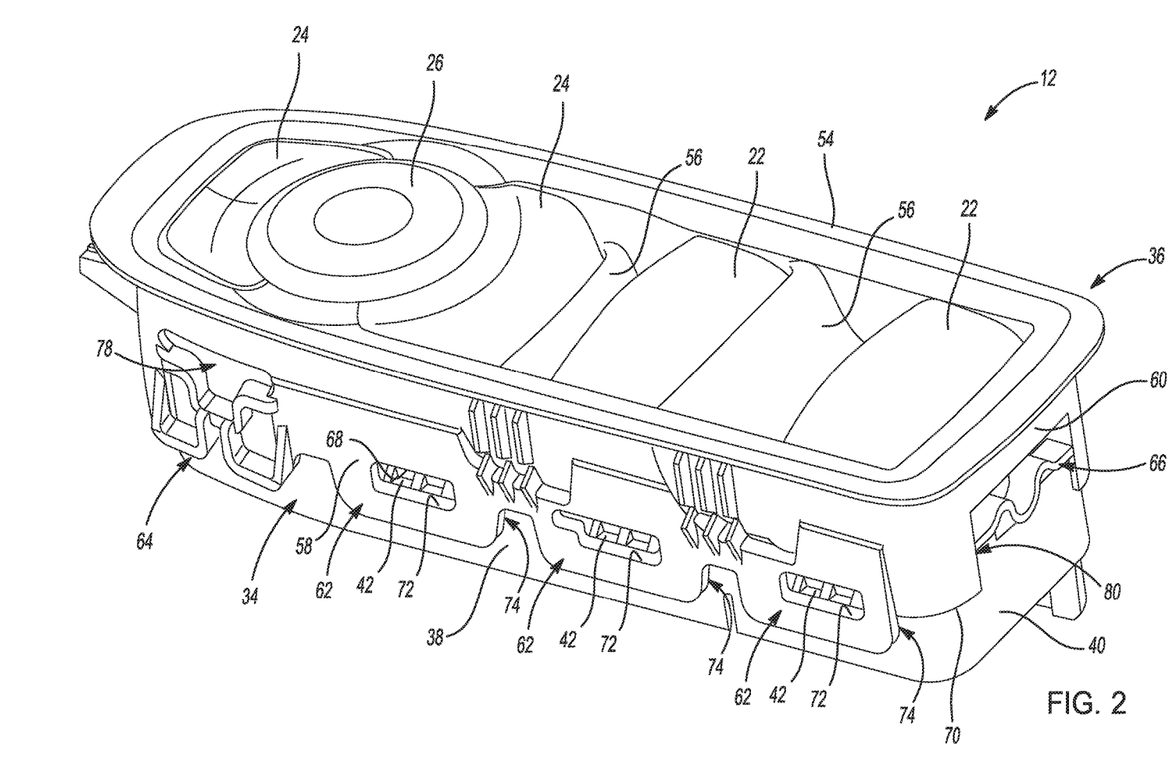
FIG. 2 is a perspective view of the switch assembly of FIG. 1.

Referring now to FIG. 2, the window switches 22, the door lock switches 24, and the rear view mirror switch 26 are included in a switch module 34 of the switch assembly 12, and the switch assembly 12 further includes a switch plate 36. The switch module 34 further includes a pair of longitudinal sidewalls 38 opposing one another, a pair of lateral sidewalls 40 opposing one another, and a plurality of protrusions 42 projecting from the longitudinal sidewalls 38. The longitudinal sidewalls 38 and the lateral sidewalls 40 collectively form a closed perimeter around the interior components of the switch module 34 including the window switches 22, the door lock switches 24, and the rear view mirror switch 26. The housing of the switch module 34 (e.g., the longitudinal and lateral sidewalls 38 and 40) and/or the switch plate 36 may be made from a rigid polymer resin such as acrylonitrile butadiene styrene (ABS).

Figure 7:
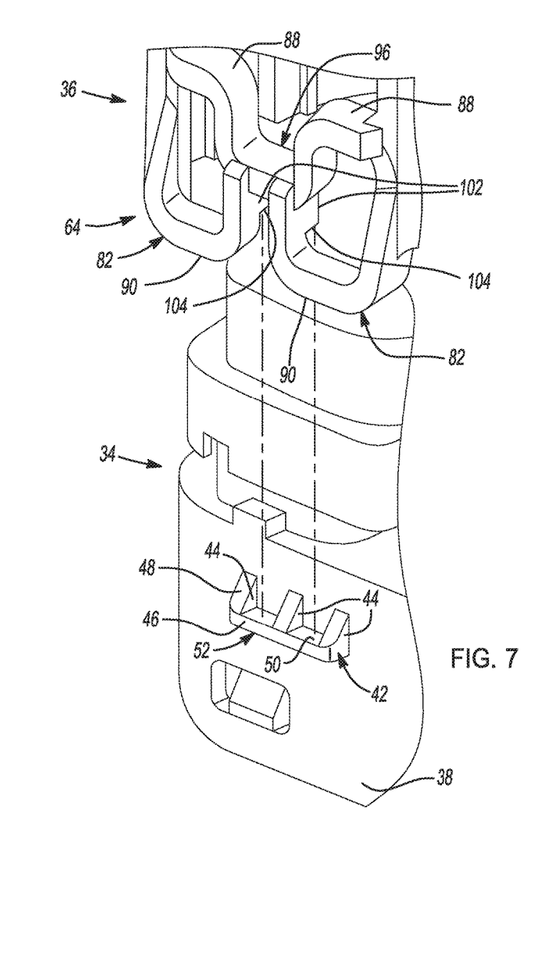
FIG. 7 is an exploded perspective view of portions of the switch assembly of FIG. 1 illustrating the fit between the connection suspension on the switch plate and a protrusion on a switch module of the switch assembly of FIG. 1.

Referring briefly to FIG. 7, each of the protrusions 42 on the longitudinal sidewalls 38 of the switch module 34 includes a plurality of triangular ribs 44 and a ledge 46 disposed below the ribs 44 and connecting the lower ends of the ribs 44 to one another. Each of the ribs 44 has a ramped upper surface 48, and the ledge 46 has a flat top surface 50 and an underside surface 52.

Referring again to FIG. 2, the switch plate 36 fits over the switch module 34 and covers electronic components (e.g., wiring, electrical connections) in the switch module 34 that may otherwise be exposed in a vehicle passenger cabin. The switch plate 36 includes a top wall 54, divider walls 56, a pair of longitudinal sidewalls 58 opposing one another, a pair of lateral sidewalls 60 opposing one another, connection clips 62, a first connection suspension 64, and a second connection suspension 66. The top wall 54 of the switch plate 36 is disposed above portions of the switch module 34 around the perimeter thereof. The divider walls 56 are disposed above portions of the switch module 34 between adjacent pairs of the window switches 22 and between one of the pairs of the window switches 22 and a pair of the door lock switches 24. The longitudinal and lateral sidewalls 38 and 40 of the switch module 34 and the longitudinal and lateral sidewalls 58 and 60 of the switch plate 36 may be referred to as base plates.

The longitudinal and lateral sidewalls 58 and 60 of the switch plate 36 fit around the longitudinal and lateral sidewalls 38 and 40 of the switch module 34 when the switch plate 36 is assembled to the switch module 34. The longitudinal sidewalls 58 of the switch plate 36 cover portions of the longitudinal sidewalls 38 of the switch module 34 when the switch plate 36 is assembled to the switch module 34. The lateral sidewalls 60 of the switch plate 36 cover portions of the lateral sidewalls 40 of the switch module 34 when the switch plate 36 is assembled to the switch module 34. Each of the longitudinal sidewalls 58 of the switch plate 36 has a lower edge 68, and each of the lateral sidewalls 60 of the switch plate 36 has a lower edge 70.

Figure 3:
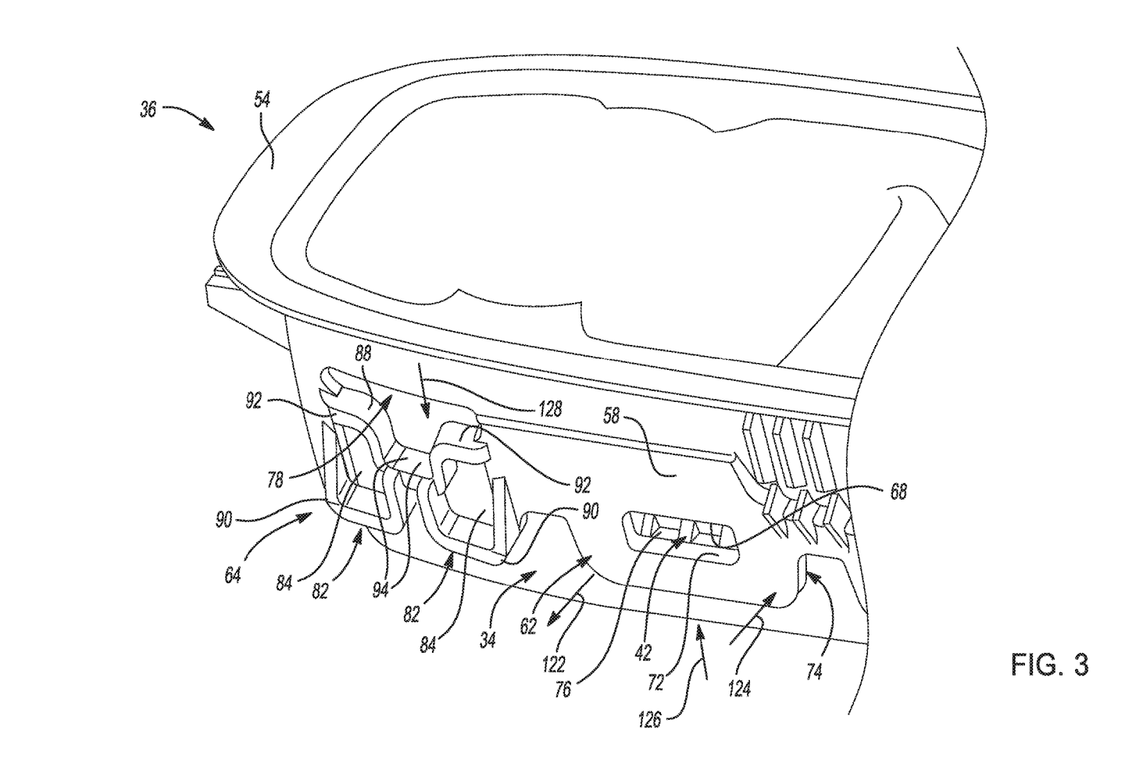
FIGS. 3 through 5 are perspective views of portions of the switch assembly of FIG. 1 illustrating exterior surfaces of a connection clip and suspension on a switch plate of the switch assembly of FIG. 1.

With additional reference to FIG. 3, each connection clip 62 is U-shaped, extends downward from the lower edge 68 of each longitudinal sidewall 58, and has an upper edge 72 and an inner surface 74. The upper edge 72 of each connection clip 62 cooperates with the lower edge 68 of each longitudinal sidewall 58 to define an opening 76 therebetween. The opening 76 in each connection clip 62 receives one of the protrusions 42 on the longitudinal sidewalls 38 when the switch plate 36 is assembled to the switch module 34. The inner surface 74 of each connection clip 62 faces one of the longitudinal sidewalls 38 on the switch module 34 when the switch plate 36 is assembled to the switch module 34.

Figure 8:
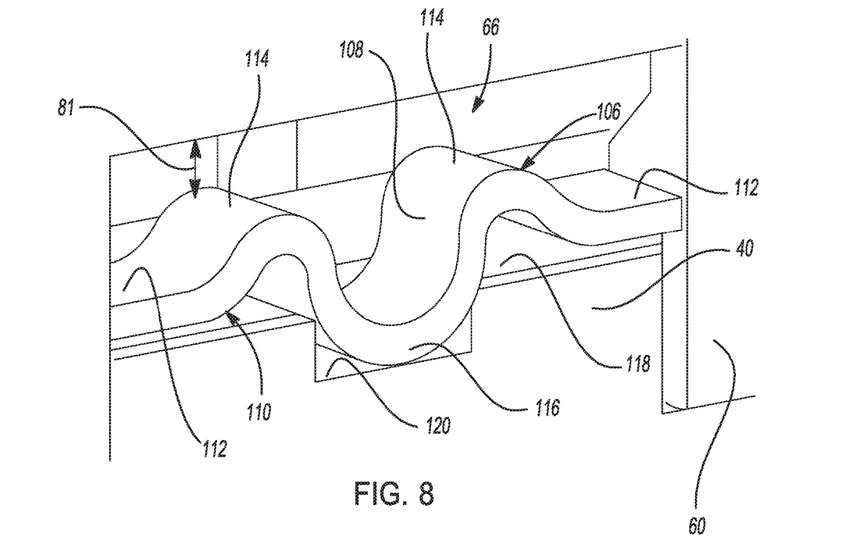
FIGS. 8 and 9 are perspective views of another connection suspension on the switch plate of the switch assembly of FIG. 1.

Referring now to FIGS. 2, 3, and 8, the lower edge 68 of each longitudinal sidewall 58 defines a notch 78 in which the first connection suspension 64 is disposed, and the lower edge 70 of each lateral sidewall 60 defines a notch 80 in which the second connection suspension 66 is disposed. The first connection suspension 64 extends across the notch 78 in the lower edge 68 of each longitudinal sidewall 58 and is connected to the lower edge 68 at opposite sides of the notch 78. Similarly, the second connection suspension 66 extends across the notch 80 in the lower edge 70 of one of the lateral sidewalls 60 and is connected to the lower edge 70 at opposite sides of the notch 80. The notches 78, 80 may be sized to yield a minimum gap 81 (e.g., about 3 millimeters (mm)) between the first connection suspension 64 and the notch 78 and between the second connection suspension 66 and the notch 80.

Figure 4:
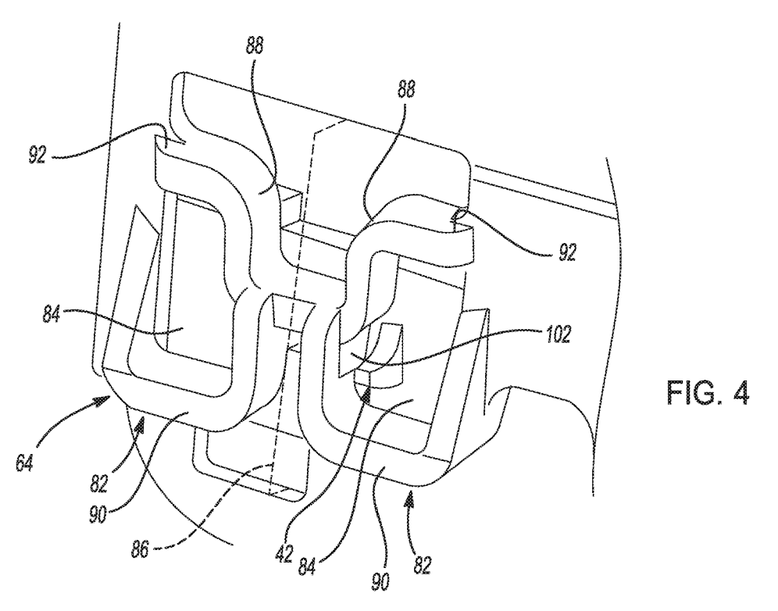
Figure 5:
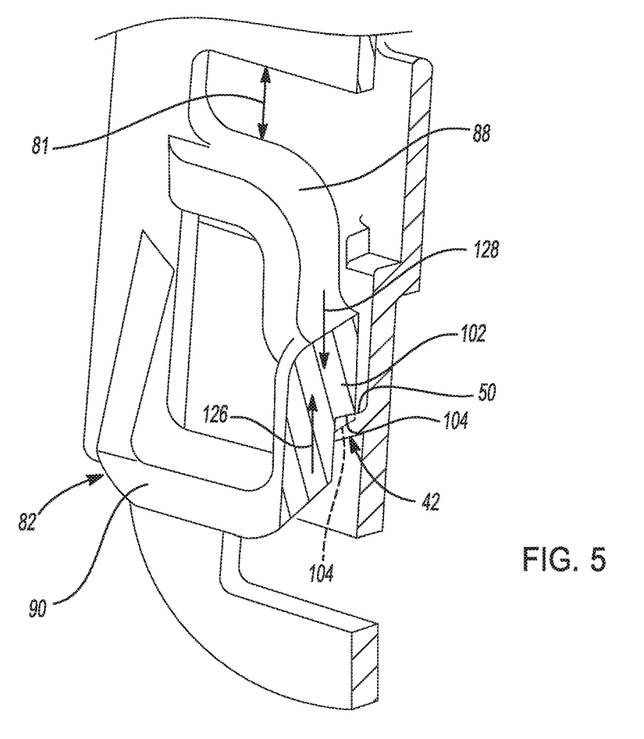

Referring now to FIGS. 3-5, the first connection suspension 64 includes a pair of flexible connection arms 82 that define a corresponding pair of openings 84 and that are symmetric with respect to a plane 86 disposed midway between the openings 84. Each flexible connection arm 82 includes an S-shaped portion 88 and a U-shaped portion 90. Each S-shaped portion 88 has a first end 92 joined to the lower edge 68 of one of the longitudinal sidewalls 58 and a second end 94 joined to the second end 94 of the other S-shaped portion 88.

Figure 6:
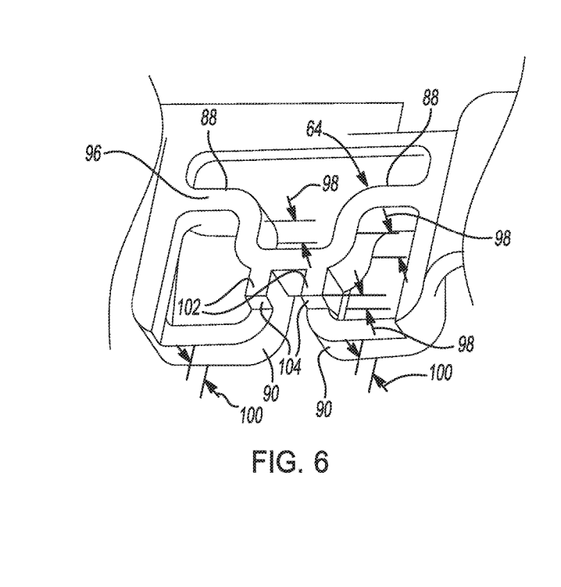
FIG. 6 is a perspective view of an interior side of the connection suspension on the switch plate of the switch assembly of FIG. 1.

With addition reference to FIGS. 6 and 7, the first connection suspension 64 has an inner surface 96 that faces one of the longitudinal sidewalls 38 on the switch module 34 when the switch plate 36 is assembled to the switch module 34. In addition, the S-shaped portion 88 of each flexible connection arm 82 and part of the U-shaped portion 90 of each flexible connection arm 82 both have a first width 98, and the remainder of the U-shaped portion 90 of each flexible connection arm 82 has a second width 100. The second width 100 is less than the first width 98, which yields suspension feet 102 having underside surfaces 104. The underside surfaces 104 of the suspension feet 102 rest on the flat top surface 50 of one of the protrusions 42 on the longitudinal sidewalls 38 when the switch plate 36 is assembled to the switch module 34, as best shown in FIG. 7.

Figure 9:
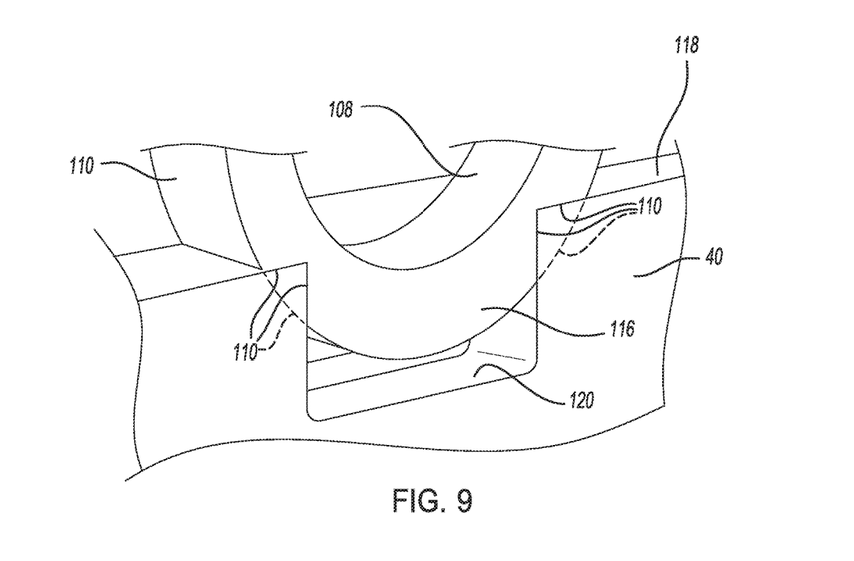

Referring now to FIGS. 8 and 9, the second connection suspension 66 includes a flexible connection arm 106 having a sinusoidal shape. The flexible connection arm 106 has an upper surface 108 and a lower surface 110. The flexible connection arm 106 includes a pair of linear portions 112, a pair of peak portions 114, and a valley portion 116.

The linear portions 112 are joined to the lower edge 70 of one of the lateral sidewalls 60 at opposite sides of the notch 80. The peak portions 114 extend between the linear portions 112 and the valley portion 116. Each lateral sidewall 40 of the switch module 34 has an upper edge 118 with a notch 120 defined therein, and the valley portion 116 is at least partially disposed in one of the notches 120 when the switch plate 36 is assembled to the switch module 34.

Referring now to FIGS. 2-9, the process of assembling the switch plate 36 to the switch module 34 and the resulting fits between the switch plate 36 and the switch module 34 will now be described. First, the switch plate 36 is positioned over the switch module 34 as shown in FIG. 7. Then, the switch plate 36 is lowered onto the switch module 34.

As the switch plate 36 is lowered onto the switch module 34, the inner surfaces 74 of the connection clips 62 contact the ramped upper surfaces 48 of the protrusions 42 on the longitudinal sidewalls 38 of the switch module 34. As the connection clips 62 engage the ramped upper surfaces 48 of the protrusions 42, the connection clips 62 flex in a direction 122 (FIG. 3) away from the ramped upper surfaces 48. This allows the connection clips 62 to be slid past the protrusions 42 and allows the openings 76 in the connection clips 62 to be positioned over the protrusions 42.

When the openings 76 in the connection clips 62 are positioned over the protrusions 42, the connection clips 62 relax in a direction 124 (FIG. 3) opposite of the direction 122 and the upper edges 72 of the connection clips 62 engage the underside surfaces 52 of the protrusions 42. The upper edges 72 of the connection clips 62 apply an upward force to the underside surfaces 52 of the protrusions 42 in a direction 126 (FIG. 3), which yields a snap fit between the connection clips 62 and the protrusions 42. This snap fit between the connection clips 62 on the switch plate 36 and the protrusions 42 on the switch module 34 yields a securing force that acts on the upper edges 72 of the connection clips 62 and secures the switch plate 36 to the switch module 34. The securing force is equal in magnitude to the upward force applied by the connection clips 62 and acts on the connection clips 62 in a direction 128 (FIG. 3) opposite of the direction 126. The upward force applied by the connection clips 62 may be equal in magnitude to (i) the sum of the downward forces applied by the first and second suspensions 64 and 66 minus (ii) the weight of the switch module 34 and, when applied, minus (iii) the downward force(s) that a user exerts on the switches 22, 24, 26.

When the connection clips 62 are snapped onto the protrusions 42, the flat top surfaces 50 on the ledges 46 of the protrusions 42 press against the underside surfaces 104 of the suspension feet 102 on the first connection suspension 64, as best shown in FIG. 5. This contact between the flat top surfaces 50 on the ledges 46 of the protrusions 42 and the underside surfaces 104 of the suspension feet 102 compresses the suspension feet 102 and yields an interference fit between the first connection suspension 64 and the protrusions 42. This interference fit is illustrated in FIG. 5, which shows one of the underside surfaces 104 of the suspension feet 102 in its relaxed state using dashed lines, and shows the same underside surface 104 in its compressed state using solid lines.

The interference fit between the first connection suspension 64 and the protrusions 42 causes the first connection suspension 64 to apply a downward force to the protrusions 42 in the direction 128 (FIG. 5). In addition, the interference fit results in a first biasing force that acts on the first connection suspension 64 in the direction 126. The first biasing force is equal in magnitude to the downward force applied by the first connection suspension 64. The first biasing force causes the first connection suspension 64 to flex in the direction 126, which is perpendicular to the directions 122, 124 in which the connection clips 62 flex. The first biasing force is transmitted to the connection clips 152 through the longitudinal sidewalls 58 of the switch plate 36, and the first biasing force biases the connection clips 62 toward the underside surfaces 52 of the protrusions 42.

Also, when the connection clips 62 are snapped onto the protrusions 42, the upper edges 118 of the lateral sidewalls 40 press against the lower surface 110 of the flexible connection arm 106 of each second connection suspension 66, as best shown in FIG. 9. This contact between the upper edges 118 of the lateral sidewalls 40 and the lower surface 110 of the flexible connection arm 106 compresses the flexible connection arm 106 and yields an interference fit between the second connection suspension 66 and the upper edges 118. This interference fit is illustrated in FIG. 9, which shows the lower surface 110 of the flexible connection arm 106 in its relaxed state using dashed lines, and shows the same lower surface 110 in its compressed state using solid lines.

The interference fit between the second connection suspension 66 and the upper edges 118 causes the flexible connection arm 106 to apply a downward force to the upper edges 118 in the direction 128. In addition, the interference fit results in a second biasing force that acts on the second connection suspension 66 in the direction 126. The second biasing force is equal in magnitude to the downward force applied by the second connection suspension 66. The second biasing force causes the flexible connection arm 106 to flex in the direction 126, which is perpendicular to the directions 122, 124 in which the connection clips 62 flex. The second biasing force is transmitted to the connection clips 152 through the longitudinal and lateral sidewalls 58 and 60 of the switch plate 36, and the second biasing force biases the connection clips 62 toward the underside surfaces 52 of the protrusions 42.

Without the first and second biasing forces, a clearance gap may be present between the underside surfaces 52 of the protrusions 42 and the upper edges 72 of the connection clips 62. In turn, the switch plate 36 may be allowed to move relative to the switch module 34 in the direction 126 or the direction 128, which may generate an undesired noise such as a squeak or rattle. However, the first and second biasing forces cause the upper edges 72 of the connection clips 62 to engage the underside surfaces 52 of the protrusions 42 and apply the upward force thereto, which limits movement between the switch plate 36 and the switch module 34.

Each connection clip 62 has a first stiffness in the direction 126 of the upward force applied by the upper edges 72 of the connection clips 62 to the underside surfaces 52 of the protrusions 42. Each first connection suspension 64 has a second stiffness in the direction 128 in which each first connection suspensions 64 applies the downward force to the protrusions 42. Each second connection suspension 66 has a third stiffness in the direction 128 in which each flexible connection arm 106 applies the downward force to the upper edges 118 of the lateral sidewalls 40. Each of the second and third stiffness is less than the first stiffness. The connection clips 62 and the connection suspensions 64, 66 may be made from the same material, and the second and third stiffness may be less than the first stiffness due to geometric differences between the connection clips 62 and the connection suspensions 64, 66.

The curvature (e.g., radii), thickness, and/or depth of the non-linear portions of the first and second connection suspensions 64 and 66 may be adjusted to adjust the second and third stiffness, respectively. In addition, the dimensions of the linear portions of the first and second connection suspensions 64 and 66 may be adjusted to adjust the second and third stiffness, respectively. The second and third stiffness of the first and second connection suspensions 64 and 66 may be adjusted to strike a balance between providing a rigid connection and minimizing installation effort.

The differences between the first, second, and third stiffness of the connection clip 162, the first connection suspension 64, and the second connection suspension 66, respectively, yields differences in the amounts by which these components deflect when the switch plate 36 is assembled to the switch module 34. For example, the connection clip 62 may deflect 1.4 mm in the direction 122 and deflect a negligible amount (e.g., 0 mm) in the direction 126, with a deformation type of plate/wall bending, when the switch plate 36 is assembled to the switch module 34. Meanwhile, the first and second connection suspensions 64 and 66 may deflect by an amount within a range from 0.5 mm to 0.75 mm in the direction 126, with a deformation type of beam element bending, when the switch plate 36 is assembled to the switch module 34.

Figure 10:
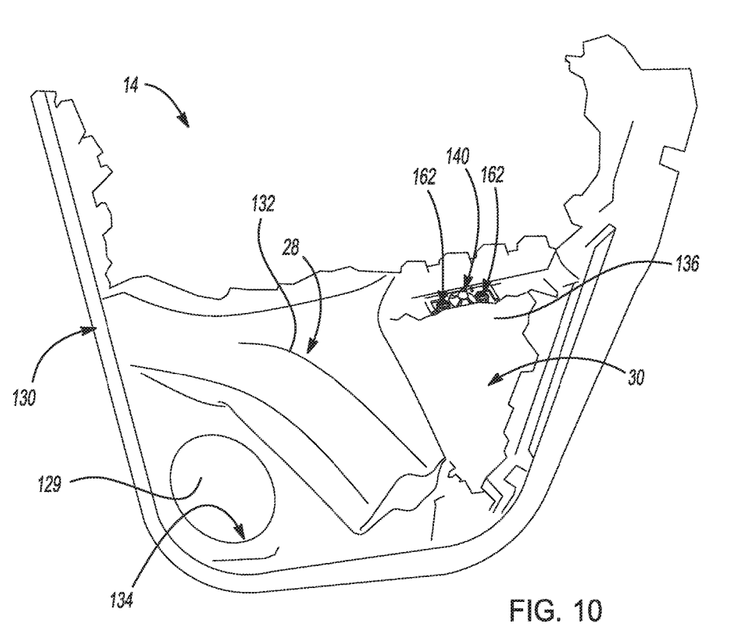
FIG. 10 is a perspective view of the door panel assembly of FIG. 1, the door panel assembly including an interior door panel and a map pocket panel according to the principles of the present disclosure.

Referring now to FIG. 10, as discussed above, the interior door panel assembly 14 includes the interior door panel 28 and the map pocket panel 30. The map pocket panel 30 defines the map pocket 32 and an opening 129 that receives the speaker 20 (FIG. 1). The interior door panel 28 has an interior surface 130, an exterior surface 132, and the map pocket panel 30 has an interior surface 134 and an exterior surface 136. When the map pocket panel 30 is joined to the interior door panel 28, a portion of the exterior surface 136 of the map pocket panel 30 covers a portion of the interior surface 130 of the interior door panel 28.

Figure 11:
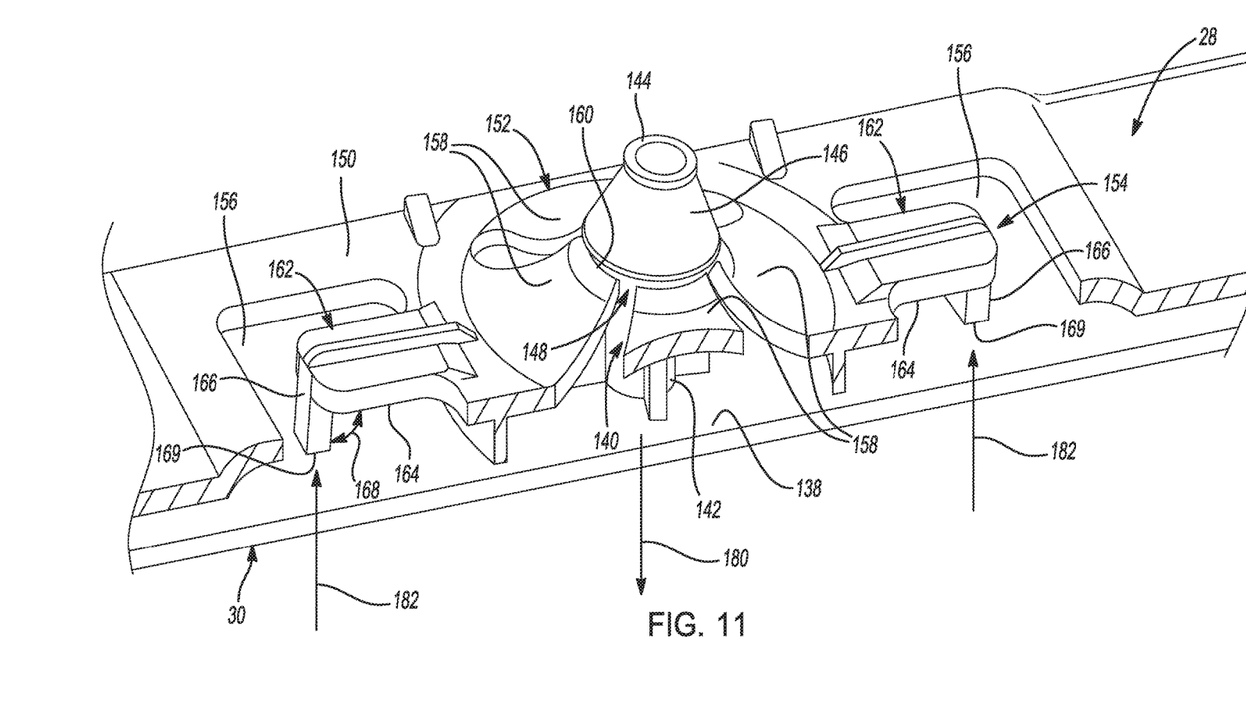
FIGS. 11 and 12 are sectioned perspective view of portions of the door panel assembly of FIG. 10 illustrating a connection clip and suspension on the map pocket panel.
Figure 12:
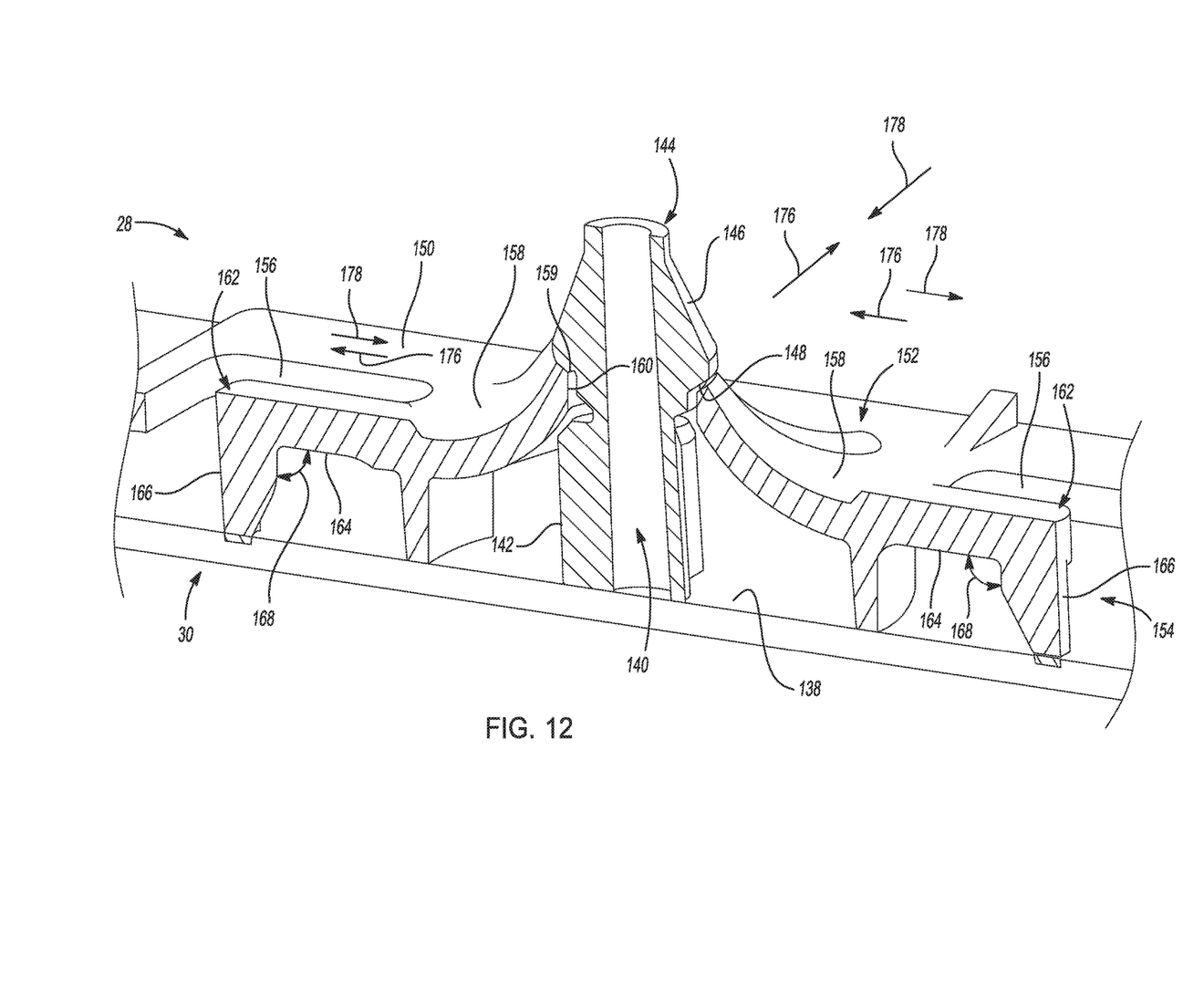

With additional reference to FIGS. 11 and 12, the map pocket panel 30 includes a base plate 138 and a protrusion 140 projecting from the base plate 138. The protrusion 140 includes a shank 142 and a head 144. The shank 142 has a cylindrical shape, and the head 144 has a mushroom shape with a ramped upper surface 146 and an underside surface 148.

The interior door panel 28 includes a base plate 150, a connection clip 152, and a connection suspension 154. The base plate 150 defines a pair of openings 156 disposed on opposite sides of the connection clip 152. The connection clip 152 includes a plurality of rigid connection arms 158 having free ends 159 and extending from the base plate 150 toward one another to define an opening 160 in the interior door panel 28. The opening 160 receives the protrusion 140 of the map pocket panel 30 when the map pocket panel 30 is assembled to the interior door panel 28.

The connection suspension 154 includes a pair of flexible connection arms 162 disposed on opposite sides of the opening 160 and extending from the base plate 150 into the openings 156 in opposite directions. The openings 156 may be sized to yield a minimum gap 163 (e.g., about 3 mm) between the flexible connection arms 162 and the base plate 150. Each flexible connection arm 162 is L-shaped and includes a linear horizontal portion 164 and a linear vertical portion 166, with an angle 168 of about 90 degrees therebetween. The linear horizontal portion 164 extends from the base plate 150 in a direction parallel to the exterior surface 132 of the base plate 150. The linear vertical portion 166 projects from the linear horizontal portion 164 in a direction toward the base plate 138 of the map pocket panel 30. The linear vertical portion 166 has an underside surface 169.

Figure 13:
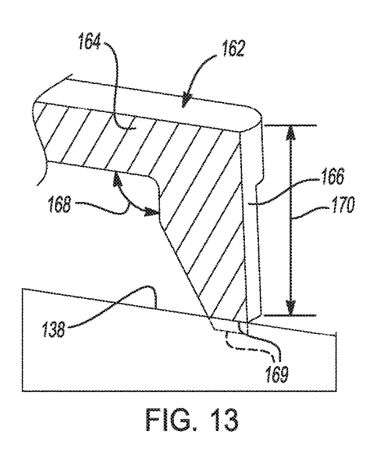
FIGS. 13 and 14 are perspective views of the connection suspension on the map pocket panel.
Figure 14:
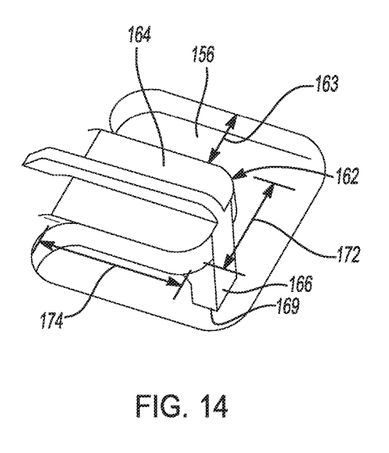

Referring now to FIGS. 13 and 14, each flexible connection arm 162 has a height 170, a width 172, and a length 174. The height 170 and length 174 of each flexible connection arm 162 may be selected to yield a desired amount of force applied by the flexible connection arm 162 to the base plate 138 of the map pocket panel 30. Increasing the height 170 respectively increases the amount of design interference between the flexible connection arm 162 and the base plate 138, which increases the amount of force applied by the flexible connection arm 162 to the base plate 138. Increasing the length 174 lowers the amount of force applied by the flexible connection arm 162 to the base plate 138. The desired amount of force applied by the flexible connection arm 162 to the base plate 138 may be selected to strike a balance between providing a rigid connection and minimizing installation effort. The width 172 and the length 174 of each flexible connection arm 162 may be selected using, for example, finite element analysis and/or manual calculations so that the flexible connection arm 162 flexes within the elastic range of the material from which the flexible connection arm 162 is made. The amount of design interference between the flexible connection arm 162 and the base plate 138 may also be verified using finite element analysis, and/or may be determined based on an estimate of manufacturing variation.

Referring now to FIGS. 10-14, the process of assembling the map pocket panel 30 to the interior door panel 28 and the resulting fits between the map pocket panel 30 to the interior door panel 28 will now be described. First, the map pocket panel 30 is positioned adjacent to the interior door panel 28 so that the protrusion 140 of the map pocket panel 30 is aligned with the opening 160 in the interior door panel 28. Although only one protrusion 140 and one opening 160 are shown, the map pocket panel 30 may include a plurality of protrusions and the interior door panel 28 may define a plurality of openings that are aligned with the protrusions. Then, the map pocket panel 30 is moved toward the interior door panel 28 so that the protrusion 140 is received in the opening 160.

As the protrusion 140 of the map pocket panel 30 is received in the opening 160 in the interior door panel 28, the rigid connection arms 158 engage the ramped upper surface 146 of the protrusion 140. This engagement causes the rigid connection arms 158 to flex in directions 176 (FIG. 12) away from the ramped upper surface 146 of the protrusion 140. When the opening 60 in the interior door panel 28 is slid past the head 144 of the protrusion 140, the rigid connection arms 158 relax in directions 178 (FIG. 12) opposite of the directions 176, and the free ends 159 of the rigid connection arms 158 engage the underside surface 148 of the protrusion 140. In turn, the head 144 of the protrusion 140 applies a force to the rigid connection arms 158 of the connection clip 152 in a direction 180 (FIG. 11) which yields a snap fit between the connection clip 152 and the protrusion 140. This snap fit between the connection clip 152 on the interior door panel 28 and the protrusion 140 on the map pocket panel 30 yields a securing force that acts on the protrusion 140 in a direction 182 (FIG. 11) opposite of the direction 180 and secures the map pocket panel 30 to the interior door panel 28. The securing force is equal in magnitude to the force applied by the protrusion 140 to the rigid connection arms 158.

When the connection clip 152 is snapped onto the protrusion 140, the base plate 138 of the map pocket panel 30 press against the underside surfaces 169 of the flexible connection arms 162, as best shown in FIG. 5. This contact between the base plate 138 of the map pocket panel 30 and the underside surfaces 169 of the flexible connection arms 162 compresses the flexible connection arms 162 and yields an interference fit between the connection suspension 152 and the base plate 138. This interference fit is illustrated in FIG. 13, which shows the underside surface 169 of one of the flexible connection arms 162 in its relaxed state using dashed lines, and shows the same underside surface 169 in its compressed state using solid lines. The amount by which the flexible connection arms 162 are compressed may be within a range from 0.4 mm to 0.6 mm. The amount by which the flexible connection arms 162 are compressed may be determined based on a tolerance stack-up analysis, which may be performed based on the amount of expected manufacturing variation between the map pocket panel 30 and the interior door panel 28. In other words, the amount of suspension travel may be intended to equal the estimated amount of manufacturing geometric variation.

The interference fit between the connection suspension 152 and the base plate 138 causes the connection suspension 152 to apply a force to the base plate 138 in the direction 180 (FIG. 11). In addition, the interference fit results in a biasing force that acts on the connection suspension 152 in the direction 182 (FIG. 11). The biasing force is equal in magnitude to the force applied by the connection suspension 152. The biasing force causes the connection suspension 152 to flex in the direction 182, which is perpendicular to the directions 176, 178 in which the rigid connection arms 158 flex. The biasing force is transmitted to the connection clip 152 through the base plate 150 of the interior door panel 28, and the biasing force biases the rigid connection arms 158 toward the underside surface 148 of the protrusion 140.

Without the biasing force, a clearance gap may be present between the underside surface 148 of the protrusion 140 and the free ends 159 of the rigid connection arms 158. In turn, the map pocket panel 130 may be allowed to move relative to the interior door panel 28 in the directions 180, 182, which may generate an undesired noise such as a squeak or rattle. However, the biasing force causes the free ends 159 of the rigid connection arms 158 to engage the underside surface 148 of the protrusion 140 and apply a force thereto, which limits movement between the map pocket panel 130 and the interior door panel 28.

Each connection clip 152 has a first stiffness in the direction 180 of the force applied by the free ends 159 of the rigid connection arms 158 to the underside surface 148 of the protrusion 140. The connection suspension 154 has a second stiffness in the direction 182 in which the base plate 138 applies the biasing force to the flexible connection arms 162. The second stiffness is less than the first stiffness. The connection clip 152 and the connection suspension 154 may be made from the same material, and the second stiffness may be less than the first stiffness due to geometric differences between the connection clip 152 and the connection suspension 154.

The differences between the first and second stiffness of the connection clip 152 and the connection suspension 154, respectively, yields differences in the amounts by which these components deflect when the map pocket panel 130 is assembled to the interior door panel 28. For example, the connection clip 152 may deflect a negligible amount (e.g., 0 mm) in the direction 182 when the map pocket panel 130 is assembled to the interior door panel 28. Meanwhile, the connection suspension 154 may deflect by an amount within a range from 0.4 mm to 0.6 mm in the direction 182, with a deformation type of beam element bending, when the map pocket panel 130 is assembled to the interior door panel 28.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle interior trim assembly comprising:
a first trim component including a first base plate and at least one protrusion projecting from the first base plate, the at least one protrusion having a ramped upper surface and an underside surface; and
a second trim component including a second base plate, a connection clip extending from the second base plate, and a connection suspension extending from the second base plate, the connection clip defining an opening configured to receive the protrusion of the first trim component when the second trim component is assembled to the first trim component, the connection clip being configured to flex as the connection clip engages the ramped upper surface of the at least one protrusion to allow the opening to be positioned over the at least one protrusion, the connection clip being configured to relax and engage the underside surface of the at least one protrusion when the at least one protrusion is positioned within the opening to yield a snap fit between the connection clip and the at least one protrusion, the snap fit securing the second trim component to the first trim component, the connection suspension being configured to yield an interference fit between the connection suspension and one of the first base plate and the at least one protrusion when the second trim component is assembled to the first trim component, the interference fit yielding a biasing force that biases the connection clip toward the underside surface of the at least one protrusion to limit movement between the first and second trim components.

2. The vehicle interior trim assembly of claim 1 wherein when the second trim component is assembled to the first trim component, the connection clip applies a first force in a first direction to the underside surface of the protrusion, the connection suspension applies a second force in a second direction to the first base plate, and the second direction is opposite of the first direction.

3. The vehicle interior trim assembly of claim 2 wherein the connection clip has a first stiffness in the first direction, the connection suspension has a second stiffness in the second direction, and the second stiffness is less than the first stiffness.

4. The vehicle interior trim assembly of claim 3 wherein the connection clip and the connection suspension are made from the same material, and the second stiffness of the connection suspension is less than the first stiffness of the connection clip due to a geometric difference between the connection clip and the connection suspension.

5. The vehicle interior trim assembly of claim 1 wherein the connection clip is configured to flex in a first direction away from the ramped upper surface of the at least one protrusion as the connection clip engages the ramped upper surface of the at least one protrusion, the connection suspension is configured to flex in a second direction when the connection suspension engages one of the first base plate and the at least one protrusion, and the second direction is perpendicular to the first direction.

6. The vehicle interior trim assembly of claim 1 wherein the connection suspension is configured to yield the interference fit between the connection suspension and the first base plate when the second trim component is assembled to the first trim component.

7. The vehicle interior trim assembly of claim 1 wherein the at least one protrusion includes a first protrusion and a second protrusion, the opening is configured to receive the first protrusion when the second trim component is assembled to the first trim component, and the connection suspension is configured to yield the interference fit between the connection suspension and the second protrusion when the second trim component is assembled to the first trim component.

8. The vehicle interior trim assembly of claim 1 wherein the connection suspension includes a flexible connection arm having a sinusoidal shape.

9. The vehicle interior trim assembly of claim 1 wherein the connection suspension includes a flexible connection arm that is L-shaped.

10. The vehicle interior trim assembly of claim 1 wherein the connection suspension includes a pair of flexible connection arms that define a pair of openings and that are symmetric with respect to a plane disposed between the openings.

11. A vehicle interior trim assembly comprising:
a switch module including at least one of a window switch and a door lock switch, sidewalls, a first protrusion, and a second protrusion, the first and second protrusions projecting from the sidewalls, each of the first and second protrusions having a ramped upper surface and an underside surface; and
a switch plate configured to cover at least a portion of the switch module, the switch plate including sidewalls, a connection clip, and a connection suspension, the switch plate sidewalls being configured to fit around the switch module sidewalls when the switch plate is assembled to the switch module, the connection clip extending from a lower edge of one of the switch plate sidewalls, the connection suspension extending from the same lower edge or a lower edge of another one of the switch plate sidewalls, the connection clip defining an opening configured to receive the first protrusion of the switch module when the switch plate is assembled to the switch module, the connection clip being configured to flex as the connection clip engages the ramped upper surface of the first protrusion to allow the opening to be positioned over the first protrusion, the connection clip being configured to relax and engage the underside surface of the first protrusion when the first protrusion is positioned within the opening to yield a snap fit between the connection clip and the first protrusion, the snap fit securing the switch plate to the switch module, the connection suspension being configured to yield an interference fit between the connection suspension and one of the switch module sidewalls and the second protrusion when the switch plate is assembled to the switch module, the interference fit yielding a biasing force that biases the connection clip toward the underside surface of the first protrusion to limit movement between the switch module and the switch plate.

12. The vehicle interior trim assembly of claim 11 wherein the connection suspension is configured to yield the interference fit between the connection suspension and the switch module sidewalls when the switch plate is assembled to the switch module.

13. The vehicle interior trim assembly of claim 12 wherein the connection suspension includes a flexible connection arm having a sinusoidal shape.

14. The vehicle interior trim assembly of claim 11 wherein the connection suspension is configured to yield the interference fit between the connection suspension and the second protrusion when the switch plate is assembled to the switch module.

15. The vehicle interior trim assembly of claim 14 wherein the connection suspension includes a pair of flexible connection arms that define a pair of openings and that are symmetric with respect to a plane disposed between the openings.

16. A vehicle interior trim assembly comprising:
a map pocket panel configured to hold items and including a first base plate and a protrusion projecting from the first base plate, the protrusion having a ramped upper surface and an underside surface; and
an interior door panel including a second base plate, a connection clip, and a connection suspension, the connection clip including a plurality of rigid connection arms extending from the second base plate toward one another to define a first opening in the interior door panel, the first opening in the interior door panel being configured to receive the protrusion of the map pocket panel when the map pocket panel is assembled to the interior door panel, the plurality of rigid connection arms being configured to flex as the plurality of rigid connection arms engage the ramped upper surface of the protrusion to allow the first opening to be positioned over the protrusion, the plurality of rigid connection arms being configured to relax and engage the underside surface of the protrusion when the protrusion is positioned within the first opening to yield a snap fit between the plurality of rigid connection arms and the protrusion, the snap fit securing the map pocket panel to the interior door panel, the connection suspension being configured to yield an interference fit between the connection suspension and the first base plate when the map pocket panel is assembled to the interior door panel, the interference fit yielding a biasing force that acts on the plurality of rigid connection arms through the second base plate and biases the plurality of rigid connection arms toward the underside surface of the protrusion to limit movement between the map pocket panel and the interior door panel.

17. The vehicle interior trim assembly of claim 16 wherein the connection suspension includes a pair of flexible connection arms extending from the second base plate in opposite directions.

18. The vehicle interior trim assembly of claim 17 wherein each of the flexible connection arms is L-shaped.

19. The vehicle interior trim assembly of claim 18 wherein each of the flexible connection arms includes first and second linear portions, the first linear portion extending from the second base plate in a first direction parallel to a surface of the second base plate, the second linear portion projecting from the first linear portion in a second direction toward the first base plate of the map pocket panel.

20. The vehicle interior trim assembly of claim 17 wherein the pair of flexible connection arms extend from the second base plate into a corresponding pair of openings in the second base plate that are disposed on opposite sides of the first opening defined by the plurality of rigid connection arms.

* * * * *